United States Patent [19]

Chen

[11] 4,121,217

[45] Oct. 17, 1978

[54] DATA TRANSMISSION NETWORK INTERFACE UNIT

[75] Inventor: Frank T. Chen, Reston, Va.

[73] Assignee: Southern Pacific Communications Company (SPCC), Burlingame, Calif.

[21] Appl. No.: 712,154

[22] Filed: Aug. 6, 1976

[51] Int. Cl.[2] .............................................. H04J 3/00
[52] U.S. Cl. .................................. 343/204; 179/15 A
[58] Field of Search .......... 179/15 A, 15 BV, 15 BA, 179/15 BS, 15 AQ, 15 AT, 18 J; 178/50, 53, 58 R; 343/200, 204

[56] References Cited

U.S. PATENT DOCUMENTS

| 3,497,627 | 2/1970 | Blasbalg et al. | 178/50 |
| 3,639,693 | 2/1972 | Bartlett et al. | 179/15 A |
| 3,794,768 | 2/1974 | Carney et al. | 178/50 |
| 3,823,401 | 7/1974 | Berg et al. | 343/204 |
| 3,824,597 | 7/1974 | Berg | 343/204 |
| 3,826,872 | 7/1974 | MacGregor | 179/15 BA |
| 3,856,993 | 12/1974 | Closs et al. | 179/15 BV |

OTHER PUBLICATIONS

"Signal Multiplexing", Author not named; from Transmission Systems for Communications, Bell Labs Staff, 1970; Chap. 6, p. 144.

Primary Examiner—Thomas A. Robinson
Attorney, Agent, or Firm—Jesse C. Bowyer

[57] ABSTRACT

Disclosed is a data transmission network having an improved interface unit for matching the network to local subscriber loops. It is particularly constructed for the translation of supervisory signals in private and switched line systems. A switched channel logic circuit comprising an assembler and parallel to serial converter is provided for each data channel and these circuits connect to a common logic circuit comprising a combiner in the form of a shifter and a matrix of shift registers.

13 Claims, 21 Drawing Figures

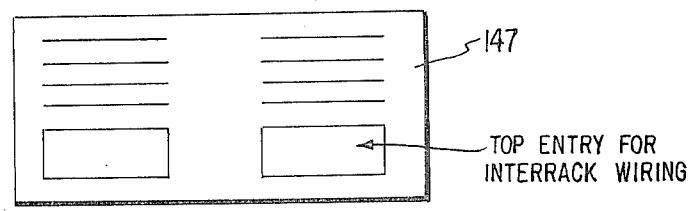
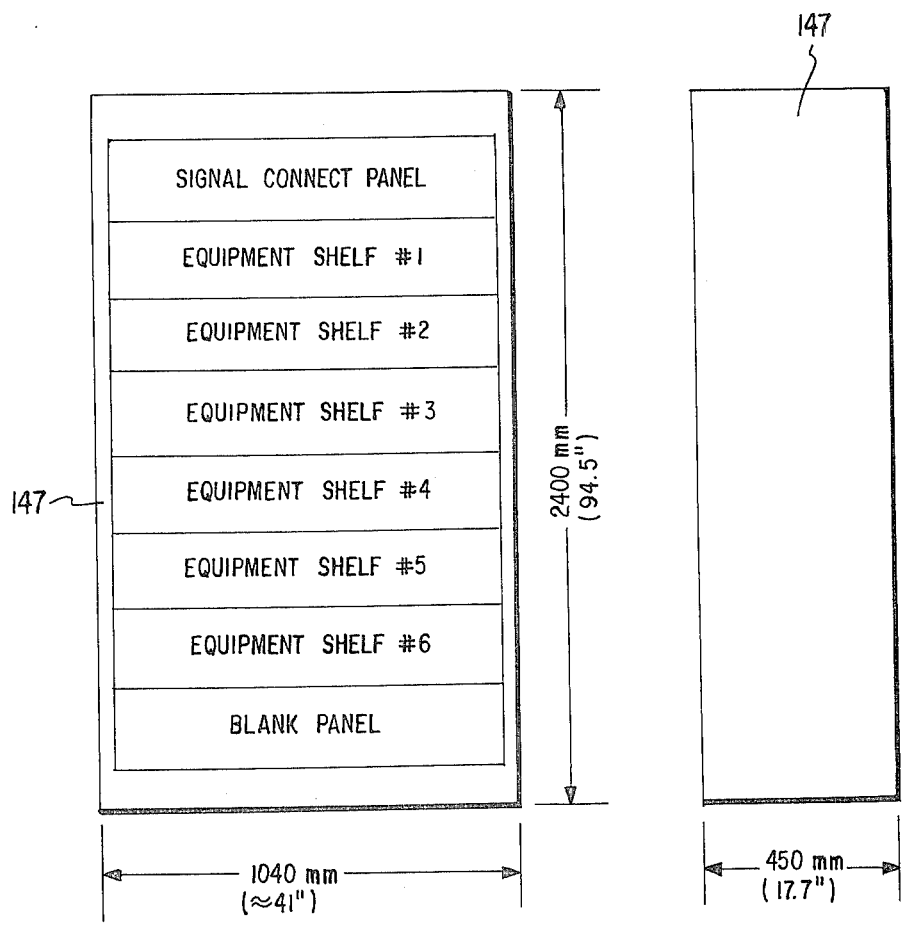
FIG. 9
FIG. 8  FIG. 10

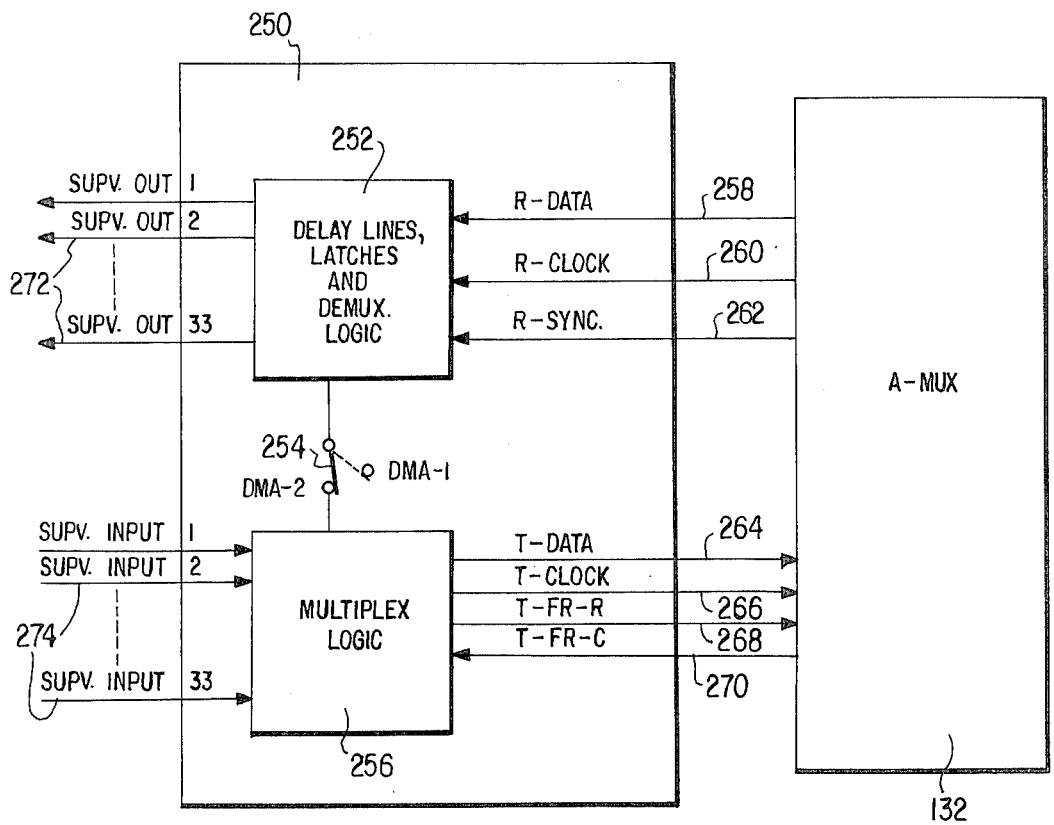
FIG. 13
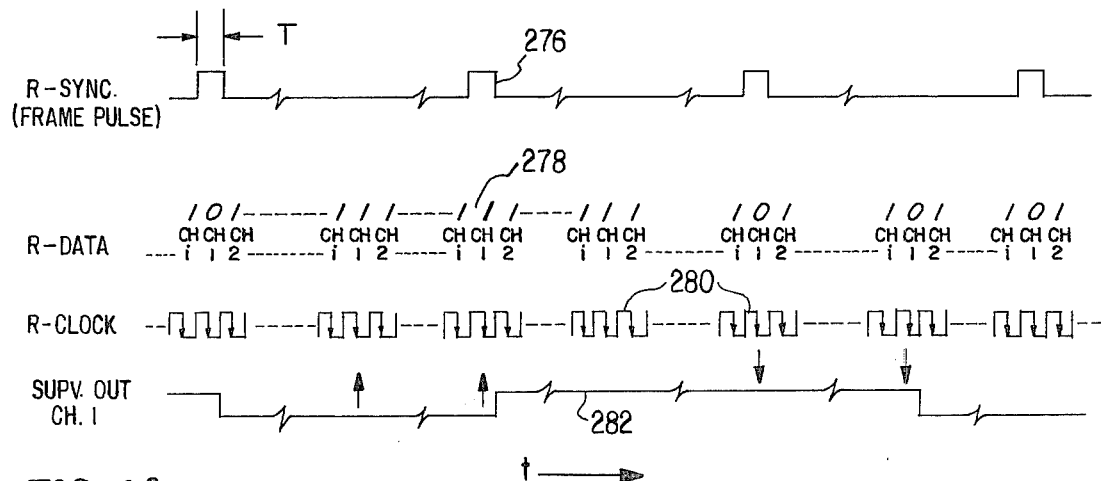
FIG. 14
FIG. 15

FIG. 18 NORMAL CONDITION

| DMA | i | $\frac{1}{T}$ |
|---|---|---|
| 1 | 33 | 4800 |
| 2 | 11 | 1600 |

FIG. 19 ALARM CONDITION

DATA TRANSMISSION NETWORK INTERFACE UNIT

The invention of this application is related to the networks disclosed in assignee's U.S. Pat. Nos. 3,823,401 and 3,824,597. The present invention is also related to Edward A. Berg application Ser. No. 463,391, filed Apr. 23, 1974, for DATA TRANSMISSION NETWORK, now abandoned; Frank T. Chen application Ser. No. 542,071, filed Jan. 17, 1975, for TIME DIVISION DATA TRANSMISSION NETWORK, now forfeited; and Frank T. Chen application Ser. No. 567,433, filed Apr. 11, 1975, for NETWORK TIMING SYSTEM, now abandoned.

It is directed to a common carrier type network for the high speed transmission of digital data in which a microwave backbone trunk is connected to subscribers in various high density or metropolitan areas by local distribution loops. More particularly, it is directed to a unit for interfacing a local distribution loop with assignee's high speed switched system and is especially adapted to provide an interface unit suitable for both switched and private line service.

As disclosed in assignee's U.S. Pat. Nos. 3,824,597 and 3,823,401, recent advances in data processing have created a recognition of the need for a high speed data transmission network. Disclosed in those patents is such a system which preferably takes the form of a synchronous data transmission network incorporating time division multiplexing (TDM) and time division switching (TDS). The system constitutes a nation-wide digital communications network engineered for the rapid transmission of data and comprises three basic elements, namely a microwave backbone trunk extending completely across the United States, a switching system for providing common carrier switched service, and a local distribution system or local distribution loops by means of which subscribers at various localities are connected into the system. Because of the diversity of local distribution loops already installed or which may be legally required, and the desirability for providing private as well as switched service, the present invention is directed to a novel interface unit for interfacing a variety of local distribution loops with the remainder of the data transmission networks described in the above patents.

For the purposes of the present invention, a subscriber loop is defined as the communication link between the A-level multiplexer of assignee's system and the subscriber end terminal. The interconnection of the subscriber loop to the A-level digital multiplexer (DMA) is accomplished through an interface unit identified as DIU-A (digital interface unit-to-A-level multiplexer). Only through this DIU-A can the communication line be established between (1) subscriber and subscriber, (2) subscriber and switching system, and/or (3) subscriber and trunking link.

The DIU-A in the present invention performs two major functions, namely, (a) signal level conversion and (b) signal control from (to) the subscriber loop to (from) the DMA, i.e., the A-level digital multiplexer. The first function is fairly straightforward and can be easily understood in that the signal level conversion simply involves changing the incoming signal levels (both data and clock) from the subscriber line to the level required at the input end of the multiplexer and performing the reverse function in the other direction. When the local distribution loop is the conventional voice grade telephone line, a modem is needed at both ends of the line in order to transmit binary signals for several miles. The function of the interface unit (DIU-A) is to convert whenever necessary the output signal of the modem at the multiplexer end at the appropriate level for multiplexing and perform the reverse function in the other direction. If the output signal of the modem is electrically compatible with the input signal of the multiplexer, the DIU-A unit simply provides a patching route for the signals from and to the modem. If the subscriber loop is a four wire digital line (with or without regenerative repeaters) then the interface unit converts the received signal in its defined form (such as diphase or bipolar) to the required signal form used by the multiplexer and then transmits the signal to the multiplexer. In the return direction, the reverse function is performed.

The second function of the DIU-A for switched service is simply to translate subscribers' active-idle status (i.e., two states only) and relay this information to the switching system by way of the multiplexers. Other control functions between subscriber and switch are done in-band. This process poses little problem in implementation simply because at the switch end there stands a more intelligent processor to handle all the control functions for all subscribers connected to the switch. Thus the data channel which is normally used for transmitting data can be time shared for sending signalling information and various control information, and consequently there is no need of an extra channel to achieve the end-to-end control functions.

The situation is different in private line services where no intelligent processor exists to interpret and relaythe various control functions between subscribers. Although it is possible to build the subscriber terminal/interface in such a way that it can monitor all the control functions in the connecting data channel, this approach is undesirable because (a) of the increase in terminal/interface costs, (b) of non-transparency of the data channel in order to reduce the small probability of occurrence of simulating the control/supervision bits by the data bit stream, and (c) there still exists a certain small probability that the data bit stream will simulate the control/supervision bits if the data channel is allowed to be transparent. As a result in the preferred construction an extra channel is provided solely for control and supervision purposes.

It is therefore one object of the present invention to provide an improved data transmission network.

Another object of the present invention is to provide an improved interface unit for a high speed data transmission network.

Another object of the present invention is to provide a novel arrangement for interfacing local subscriber loops with a high speed switched digital data transmission network.

Another object of the present invention is to provide an interface unit for a data transmission network which makes possible the provision of both switched and private line service for a common carrier.

Another object of the present invention is to provide a novel digital interface unit for interfacing local lines with modems to the first level multiplexer/demultiplexer of a high speed data transmission multiplexer/demultiplexer hierachy.

These and further objects and advantages of the invention will be more apparent upon reference to the following specification, claims and drawings wherein:

FIGS. 8, 9 and 10 are front, top and side views respectively of the physical configuration of the DIU-A;

FIG. 13 is a block diagram of a supervisory input/output module;

FIG. 14 shows waveforms constituting timing diagrams of received data at the supervisory input/output;

FIG. 15 is a chart explanatory of FIG. 14 for two types of A-level multiplexers;

FIG. 18 is a circuit diagram showing the fault alarm and control system interface in its normal condition; and FIG. 19 is a circuit diagram showing the fault alarm and control system interface in the alarm condition.

Figure 1:
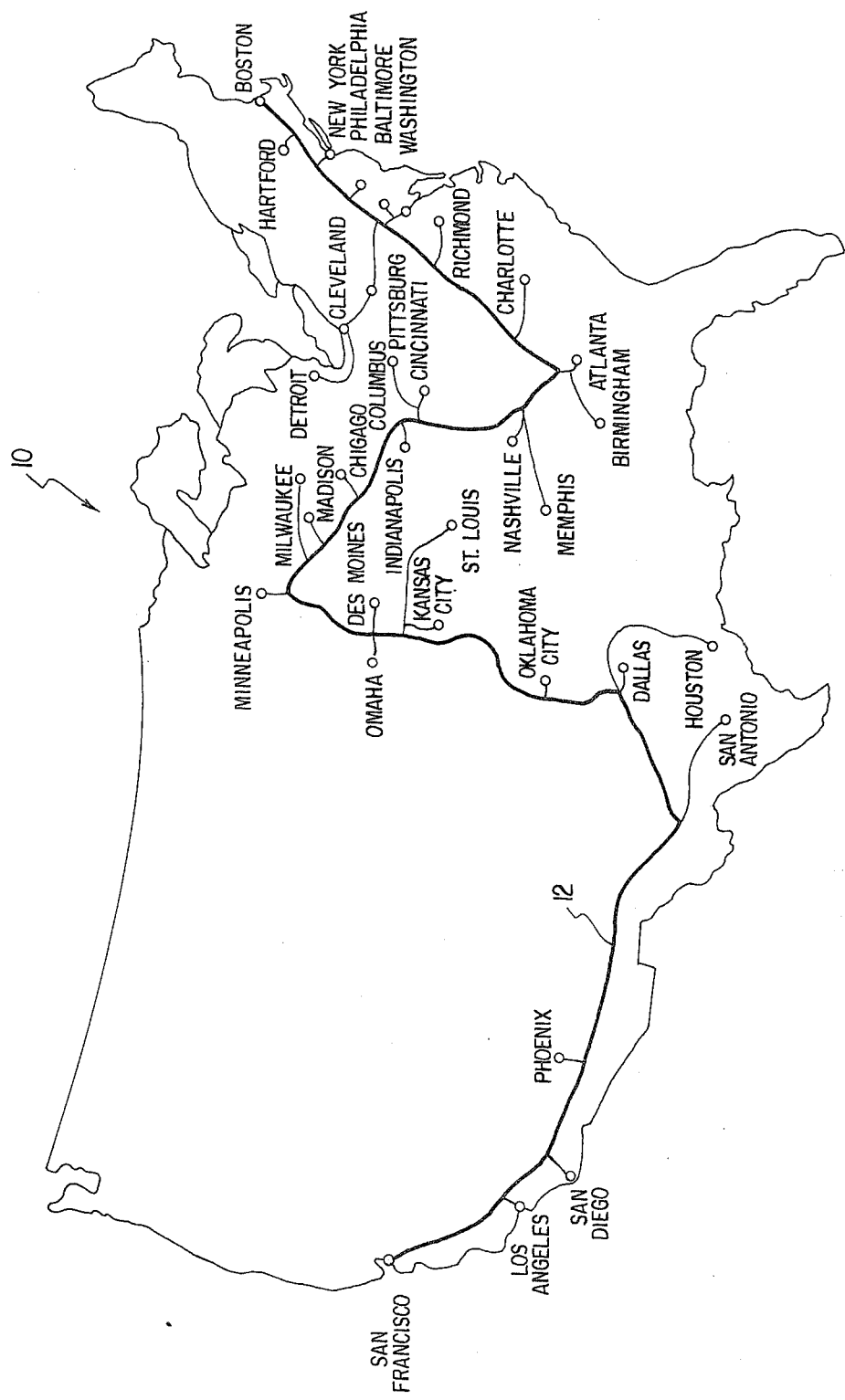
FIG. 1 is a diagram showing the transcontinental data transmission system of the present invention extending from San Francisco on the West Coast to Boston on the East Coast.

Referring now to FIG. 1 of the drawings, the system of the present invention is generally indicated at 10 and comprises an interconnected series of high channel density microwave backbone trunklines 12 following a route between San Francisco, Los Angeles, Dallas, Minneapolis, St. Paul, Atlanta, and Boston. Spur routes from the backbone trunk provide service to additional cities, such as San Antonio, Houston, St. Louis, Columbus, Cleveland, and Detroit. The route was selected to service the maximum number of subscribers by selecting for additional service the cities which are considered to have the greatest potential need for data communication. The principal indicators utilized in identifying each city are total population, number of corporations, dollar sales volume, number of computers, number of communication terminals, and the number of employees of the corporations. These indicators identified a large number of cities, but the 35 cities illustrated in FIG. 1 were selected for initial service on the basis of their immediate high potential interaction with data communications, as well as their proximity to the trunk.

In the common carrier system of this invention a graduated scale of data rates are offered on a switched service basis to accomodate the growing demands for reliable, available and economical data transmission facilities while maintaining compatibility with existing data communicating terminals. Initially service up to two thousand bits per second (BPS) in the asynchronous mode and up to 14,400 bps in the synchronous mode of transmission are provided on a switched basis. The network is constructed to accomodate greater speeds of switched services as the market requires. In addition to the above speeds, 19,200 bps and 48,000 bps may be provided.

The system of the present invention is completely transparent in that a subscriber need not convert his signals to a different transmission mode since the system transmits the digital signal in its original form. Maximum continuity is preserved and transmission efficiency is heightened. A further significant characteristic of the digital transmission system is the manner in which the signals are relayed. Each microwave station in the system is regenerative, it restores the symbol or bit pattern and transmits a new, clean and conditioned signal. Thus, noise is not cumulative as it is in analog transmission systems, and errors in transmission are reduced accordingly. Provisions for higher bit rate capabilities can be accomplished by a wiring change at the multiplexer servicing the subscribers and installation of new equipment is not necessary and no other changes are required in the basic transmission system.

The network makes full use of time division multiplexing (TDM) techniques with simple phase shift keying of the radio transmitter to increase the efficiency of data transmission. The signals from the time division multiplexing process are applied to a modulator which generates a multiphase signal. This signal is further amplified by the transmitter and applied to a microwave antenna for transmission. The modulator can be replaced with other modulator equipment with higher indices, so that approximately four thousand 4,800 bps channels may be transmitted simultaneously over a single radio path. The received signal is amplified, demodulated, and then conditioned to provide a clean, high speed data signal as an input to the demultiplexer. This demultiplexer separates the composite high speed signals into a channel grouping suitable for input to a time division switch matrix. The switch directs the appropriate signal channels to the desired subscriber by way of a local distribution loop. Operation of the total system is full duplex (two-way simultaneous transmission).

The time division multiplexing in the system assigns to each data channel a specific time slot for the transmission of data. In this way, the full power of the transmitter is delivered to each discrete time slot, avoiding the problems in conventional frequency division multiplexing systems caused by varying load conditions which occur where power must be shared with each additional channel added. Low speed channels (150 bps) can be derived from the basic 4,800 bps channels, again using TDM equipment. Special switched service groups, such as 9,600 bps and 14,400 bps can also be provided by combining the basic 4,800 bps channels. The data carried on the system is transmitted over a high density microwave channel backbone trunk illustrated at 12 in FIG. 1 traversing the United States on a route selected to serve the major data concentration points in the country. Spur trunks utilizing identical electronic equipment carry the data to city locations specified as district offices, lying off the backbone trunk route.

The microwave backbone trunk consists of microwave stations, each of which is either a repeater or a branching repeater. Each repeater receives, amplifies, and transmits all channels in the microwave path; a branching repeater has the additional capability of allowing a portion of the channels to be inserted. The channels dropped may be terminated at that point or may be transmitted over a microwave spur to provide service at locations not on the primary route. Connected to the microwave system are regional offices (RO) which control the routing of the switching network. Each RO has direct control of up to 10 district offices (DO) where local switches are located. Each district office in the network can communicate with all regional offices and can economically provide termination points for 500 to 10,000 terminals.

Interfacing with the microwave backbone trunk are the local distribution facilities which are preferably comprised of low power microwave equipment operating in the 11 Gigahertz common carrier band. In order to optimize the utilization of frequencies, the local distribution system is designed to provide maximum subscriber density of each link. In the preferred embodiment the local distribution system consists of 16 basic microwave terminals, each with a 100 channel drop and insert capability. Additionally, the system has four high density terminals, each with a 400 to 1,000 channel drop and insert capability. The local distribution system has the capability of terminating approximately 1,700 4,800 bps subscriber terminals without the use of a line concentrator.

An important feature of the present invention is the capability to interface the microwave backbone trunk with different types of local distribution systems and the present system is designed to provide inter-connection capability with other time division multiplex or another analog modes of transmission. Other TDM carriers can be interconnected directly with the transmission system at a branching repeater or district office. Interconnection is not restricted to like mode carriers. Other microwave carrier or cable systems can interconnect with the present network regardless of transmission characteristics of carrier system. However, appropriate interfacing equipment is required and the characteristics of the service to the customer on an end to end basis is limited by the lowest quality characteristics as between the two systems.

Figure 2:
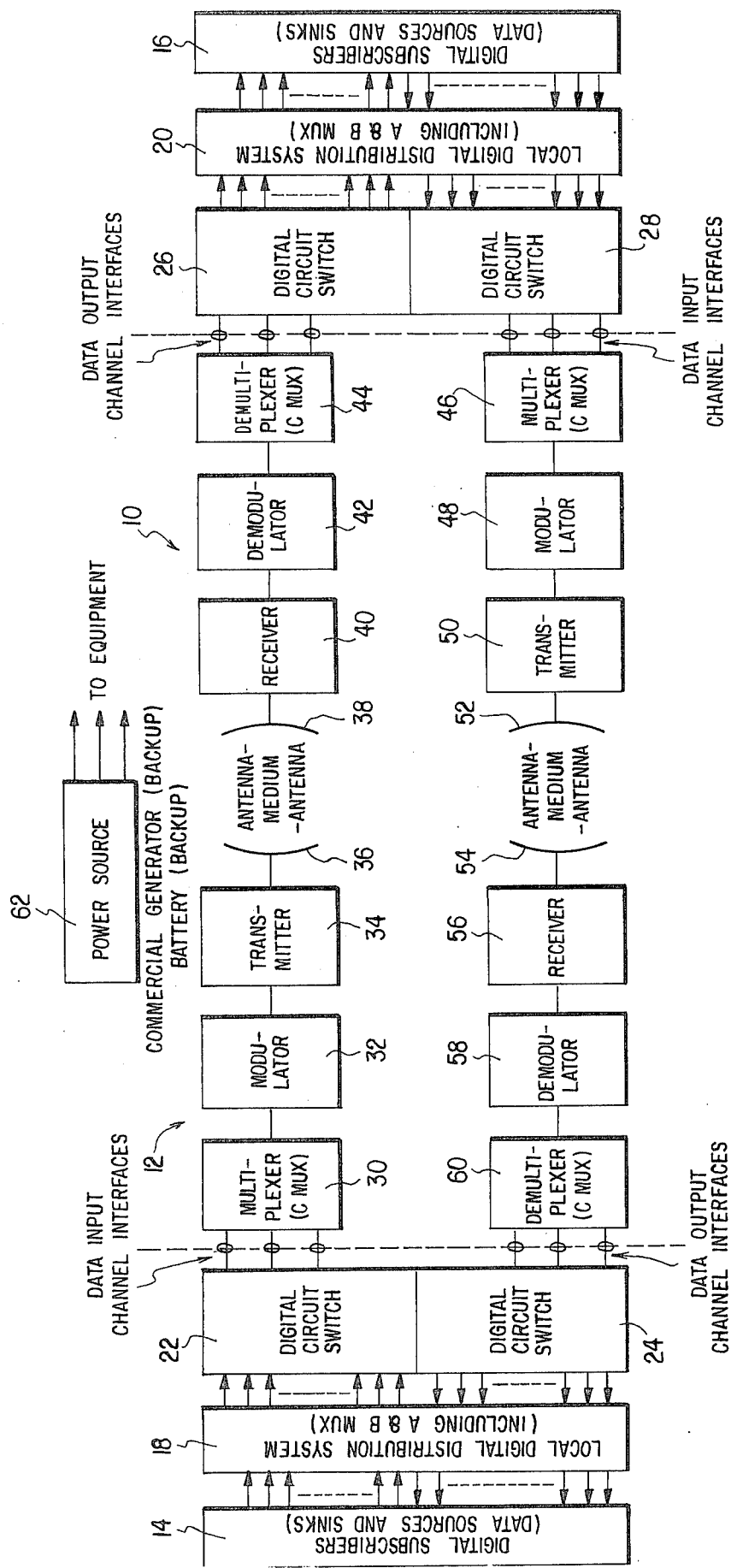
FIG. 2 is a simplified block diagram showing the time division multiplex system of the present invention.

FIG. 2 is a simplified overall block diagram of the basic system 10 of the present invention. The system is shown as connecting a first set of digital subscribers 14 at one point in the system to a second set of digital subscribers indicated at 16. The digital subscribers are connected through local digital distribution loops 18 and 20, respectively. Local distribution system 18 is connected to the trunking system 12 by digital circuit switches 22 and 24. Local digital distribution system 20 is similarly connected into the trunking system by digital circuit switches 26 and 28.

Transmissions from the digital subscribers 14 pass through the local distribution system 18 and the digital circuit switch 22 to a multiplexer 30, modulator 32, and transmitter 34, where they are transmitted by a microwave antenna 36 through the air (and by way of suitable repeaters where necessary) to a receiving antenna 38. The received signals pass through receiver 40, demodulator 42, and demultiplexer 44, where they are applied through digital circuit switch 26 and local digital distribution loop 20 to the subscribers 16. Similarly, signals from subscribers 16 are transmitted through the local distribution loop or system 20, and digital circuit switch 28 to a corresponding multiplexer 46, modulator 48, transmitter 50, and transmitting antenna 52. These signals are picked up by receiving antenna 54 and passed through receiver 56, demodulator 58, demultiplexer 60, and pass through digital circuit switch 24 and local loops 18 to the subscribers 14. Power sources are provided for the various components as indicated generally at 62 and these comprise commercial power sources, local generators as backup, and battery power supplies also as backup and rechargeable from the generators.

As can be seen from FIG. 2, the overall system starts and ends with the digital subscribers. These are the data sources and sinks as shown at the extreme right and left of the block diagram. Each subscriber is connected to the overall system by means of a local digital distribution loop. The loops are in turn connected to a digital circuit switch which selects an appropriate circuit for the generated data transmission or selects the address at which the incoming data is to be terminated.

Starting at the top left of the block diagram in FIG. 2, the digital circuit switch interfaces with the multiplexer by means of a plurality of data input channel interfaces. The multiplexer 30 combines the separate data channels into a single high speed data stream operating at approximately a 20 megabit rate. This 20 megabit data stream is applied to the modulator 32 which generates a 8-phase signal. The 8-phase signal is further amplified by the transmitter 34 and applied to the antenna 36 for transmission. The received signal is first amplified in the receiver 40, then demodulated in the demodulator 42 where the data stream is also conditioned to provide a clean, high speed data signal as an input to the demultiplexer 44. The demultiplexer 44 separates the composite high speed signal into corresponding subgroups and applies these data streams to the digital circuit switch 26. The function of this switch is to direct the appropriate signal channels to their respective subscribers or addresses, and apply these signals to the data sinks.

Since the overall operation is fully duplex, signals generated by data sources at the subscriber locations can be transmitted simultaneously back to the other end of the system. The data processing is identical to that just described as the two channels shown at the top and bottom of the block diagram of FIG. 2 are identical, one providing a signal path from the left to the right and the other serving the data sources on the right and data sinks on the left.

Figure 3:
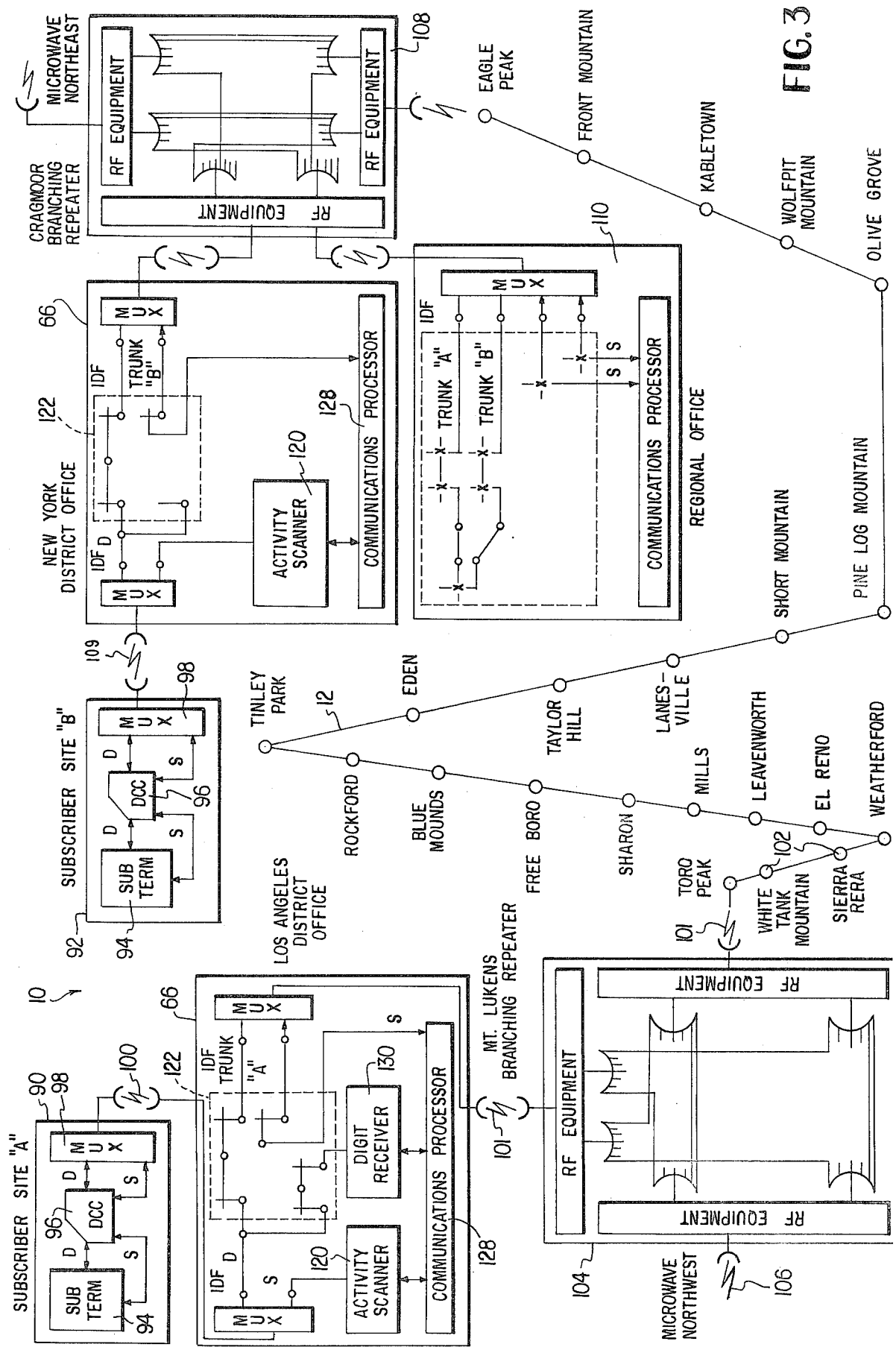
FIG. 3 is a system diagram showing a transcontinental digital connection inter-office call between Los Angeles and New York.

FIG. 3 is a slightly more detailed diagram of the system 10 of the present invention showing some of the circuitry of the district and regional offices. FIG. 3 shows an arrangement for connecting between a subscriber site A indicated at 90 and located at Los Angeles, with a subscriber site B indicated at 92 and located at New York. The subscriber circuitry is the same and comprises a subscriber terminal 94, such as a computer or the like, a digital communication console DCC 96 for controlling the call, and a multiplexer/demultiplexer (MUX) 98. Connection is by way of a local distribution loop including a microwave link 100 to the Los Angeles district office 66.

From the district office, the communication signal passes through the microwave backbone link 101 to suitable repeaters indicated by the circles 102. A typical branching repeater is indicated at 104 and this branching repeater is illustrated as not only capable of relaying the signal from the Los Angeles district office to the Toro Peak repeater, but also adding signals received by a microwave antenna 106. It is understood that the branching repeaters may add channels, drop channels, or both.

The signals from subscriber site A pass through the microwave repeaters 102 and through an eastern branching repeater 108 to the New York district office 66 and to a regional office 110. The signal passes from the New York district office to subscriber site B at 92 by way of a local distribution loop including microwave link 109.

Figure 4:
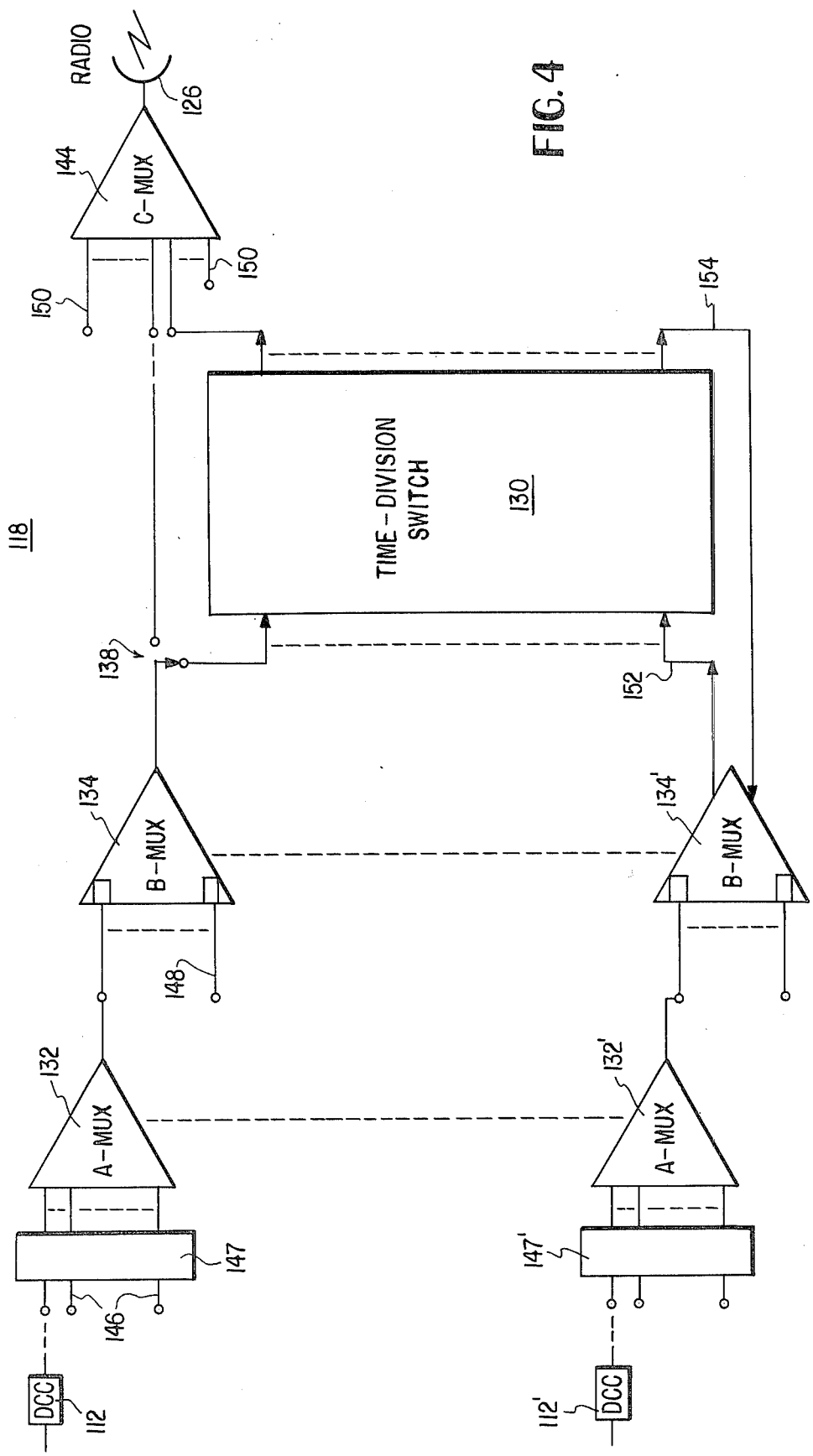
FIG. 4 is a block diagram showing the connection of the time division switch in accordance with the present invention to the multiplexer hierachy and by way of interface units to local subscribers or customer loops.

FIG. 4 is a detailed block diagram of the system of the present invention showing the three stage or three level multiplexer hierarchy forming the time division multiplex system in conjunction with the time division switch. The subscriber or customer digital communication console (DCC) 112 is shown connected thru DIU-A 147 to an A-level multiplexer/demultiplexer 132 (A-MUX) in turn connected to a B-level multiplexer/demultiplexer 134 labeled B-MUX. The B-MUX 134 is in turn connected through a switch 138 by way of a lead line to the time division switch 130. If no switching is necessary or desired at this end of the line, switch 138 may be actuated to connect the output of B-MUX 134 directly to a C-level multiplexer/demultiplexer 144 labeled C-MUX which is in turn connected to the microwave radio as indicated by the antenna 126. Additional inputs to the A-MUX 132, B-MUX 134, and C-MUX 144 are illustrated by the input/output lines 146, 148 and 150, respectively. It is understood that several DCC's 112 are connected to A-MUX 132, that several A-MUXs are connected to B-MUX 134, and that several B-MUXs are connected either directly or through the time division switch 130 to the C-MUX 144 so that a multiplexer/demultiplexer hierarchy is formed with the high side (the right side in FIG. 4) of each multiplexer being at a higher bit rate than the preceding multiplexer in the hierarchy.

The connection of A-MUX 132 and B-MUX 134 in FIG. 4 illustrates transmission or reception through the microwave trunk by way of antenna 126 and this connection is shown either directly or through the time division switch 130 as the case may be. In the preferred embodiment, the A-MUX, B-MUX, time division switch, and C-MUX are all at the same location. A local distribution loop or customer's loop is connected to A-MUX 132 by way of DIU-A as 147 illustrated by the various lines 146. Additional A-MUX 132' is similarly connected to additional customer DCC's 112' by DIU-A 147'. The multiplexer/demultiplexers form part of the system which acts to switch local calls through the time division switch 130 as indicated by the input lead 152 to the switch and the output lead 154 back to the B-MUX 134'. It is understood that time division switch 130 can connect any input to any output so that it is capable of switching both trunk calls and local calls, the two different cases being illustrated by the representative DCC's 112 and 112'.

The details of the multiplexer hierarchy illustrated in FIG. 4 may vary widely and involve many considerations. However, briefly and by way of example only, A-MUX 132 may be connected on its low side to thirty-four channels 146 having a maximum transmission rate of 4.8 kilobits per second. The high side of A-MUX 132 has a bit rate of approximately 168 kilobits per second obtained by bit interleaving techniques and fifteen A-MUXs 132 are connected to the low side of B-MUX 134 so that the high side of B-MUX 134 has a bit rate of approximately 2.688 megabits per second. Ten B-MUXs 134 are connected to the low side of C-MUX 144 so that the high side of C-MUX 144 has a bit rate of 21.504 megabits per second. This provides a total of 4,480 4.8 kilobits per second channels.

Figure 5:
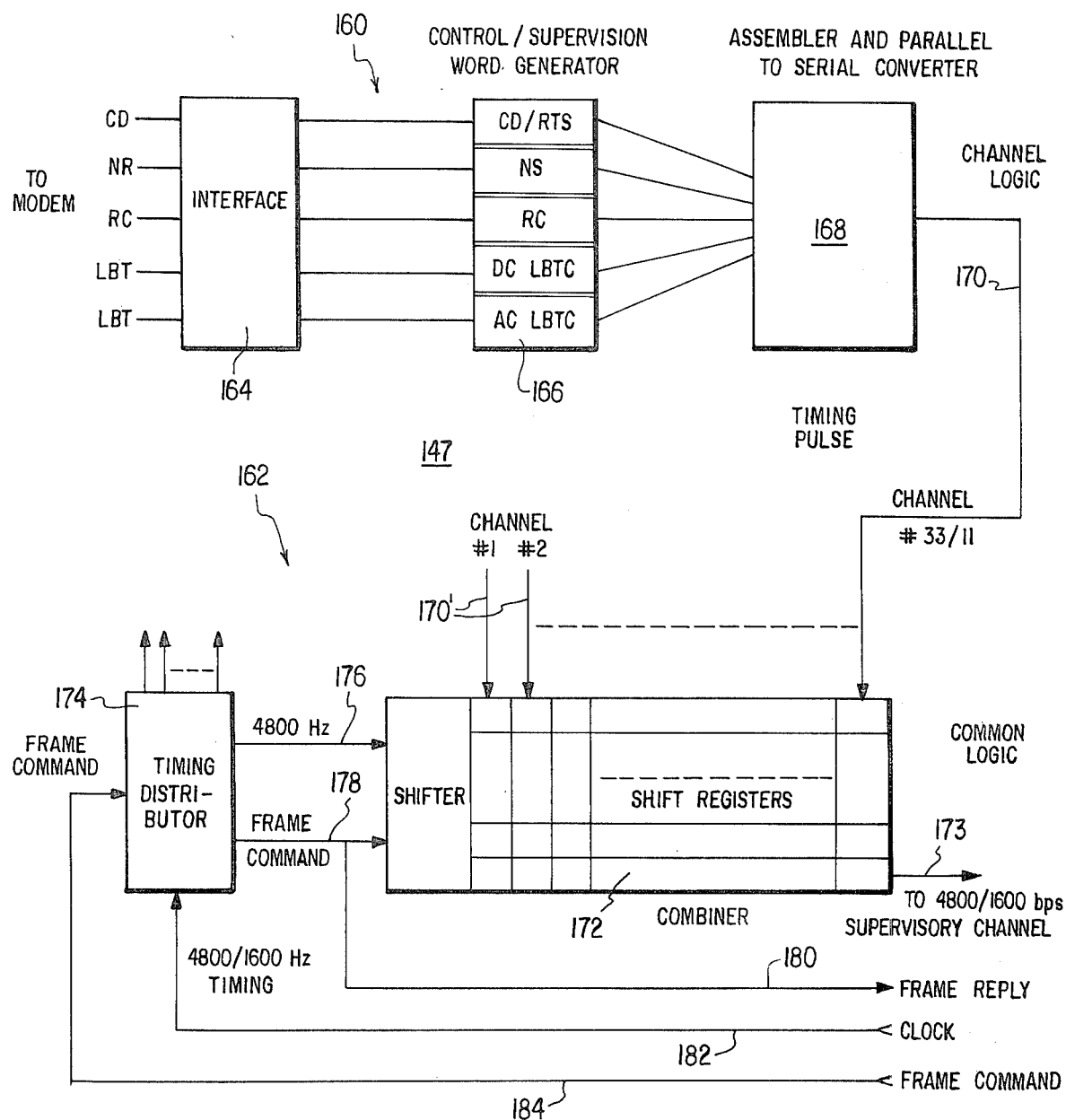
FIG. 5 is a block diagram of a DIU-A constructed in accordance with the present invention.

FIG. 5 is a detailed block diagram of a DIU-A constructed in accordance with the present invention and by way of example only may comprise DIU-A 147 shown in FIG. 4. It is formed of two basic logic components, namely, the channel logic illustrated at 160, and the common logic illustrated at 162. The channel logic, which is individual to each channel, comprises an interface 164, a control/supervision word generator 166, an assembler and parallel to serial converter 168, and a lead 170 shown as connecting the logic for that channel to the common logic assembly 162. It is understood that other leads 170' connect the other channels which may be either eleven or thirty-three in number to the common logic. The number of channels is determined by whether a thirty-three channel A-MUX identified as DMA-1 or an eleven-channel A-MUX identified as DMA-2 is used for the A-level multiplexer/demultiplexer. The common logic includes the combiner 172 and the timing distributor 174 which are common to all eleven or thirty-three channels and which are time shared by the channels. Combiner 172 comprises a shifter and shift registers and a supervisory channel output lead 173. Timing distributor 174 is connected to the combiner by leads 176 and 178 and suplies to the A-MUX a frame reply by way of lead 180. It receives from the A-MUX by way of a lead 182 clock signals and by way of lead 184 frame command signals. Interface unit 164 connects the DIU-A 147 to the local subscriber modem and the timing distributor 174 connects the DIU-A to the A-MUX, i.e., DMA-1 or DMA-2.

DIU-A 147 is constructed on the basis that most private line services are through modem connections by way of telephone voice grade lines and that private line service by way of digital lines is a special case in which no modem other than a line driver/receiver is needed. In effect, the private line service by way of modem connection is considered the worst case of local distribution or customer loop connection. With known modems there exists no more than five identifiable control/supervisionfunctions needing a transfer between subscriber ends. They are (1) carrier detect/request to send; (2) new sync; (3) rate change (automatic); (4) DC loopback; and (5, AC loopback. Only the first is absolutely necessary under all circumstances. The second function is for a special class of subscribers who use IBM terminals and/or equivalents. The third function is needed as communication channel fall-back control. The rate change signal is on whenever the performance of the higher speed communication channel is degraded below a threshold level. When this happens, the fall-back lower speed channel will be used; for example, change from 9,600 bps channel to 4,800 bps channel. The existence of the rate change control signal is dependent on the type of modem in use. The last two loopback control functions are two desirable maintenance features which may or may not exist in some modem designs. If the above five control/supervision functions are all needed and allowing flexibility for future additions of other functions, a 5-bit word is sufficient to provide all necessary functions with the following assignment:

| Word | | | | | Assignment |
|---|---|---|---|---|---|
| $b_1$ | $b_2$ | $b_3$ | $b_4$ | p | |
| 1 | 0 | 0 | 0 | 1 | CH. ON and CD/RTS OFF |
| 1 | 0 | 0 | 1 | 0 | CH. ON and RC OFF |
| 1 | 0 | 1 | 0 | 0 | CH. ON and NS OFF |
| 1 | 0 | 1 | 1 | 1 | CH. ON and DC LBTC |
| 1 | 1 | 0 | 0 | 0 | CH. ON and AC LBTC |
| 1 | 1 | 0 | 1 | 1 | CH. ON and NS ON |
| 1 | 1 | 1 | 0 | 1 | CH. ON and RC ON |
| 1 | 1 | 1 | 1 | 0 | CH. ON and CD/RTS ON |
| 0 | 0 | 0 | 0 | 0 | CH. OFF and LINE IDLE |

The p-bit in the word $b_1 b_2 b_3 b_4 p$ stands for parity check bit. The meanings of various abbreviations are:

| | |
|---|---|
| CH. ON | Channel On and Active |
| DC LBTC | DC loop back test command on modem |
| AC LBTC | AC loop back test command on modem |
| RC OFF/ON | Rate change signal OFF/ON |
| NS OFF/ON | New Sync Signal OFF/ON |
| CD/RTS OFF/ON | Carrier Detect/Request to Sent Signal OFF/ON |

The flexibility for future expansion to accommodate additional control/supervision functions must exist. This is done if needed by expanding the word length by 1-bit, i.e., $b_1 b_2 b_3 b_4 b_5 p$; therefore, a total of 16 control/supervision functions can be handled by this expanded word format.

Two important aspects, when transmitting the above control/supervision words in the multiplexer system of the present invention, are channel sharing and response time. With respect to channel sharing, all control/supervision bits are multiplexed together and share a common supervision channel of a A-MUX. With respect to response time, the time for response of a specific control/supervision signal is critical and must be carefully controlled. These two features are not completely independent and because of this the second of two possible channel sharing arrangements is provided. That is, there are two channel sharing techniques; (1) on demand basis, and (2) fixed time slot assignment. The first naturally results in faster response time provided the channel fill factor of the multiplexer is low. While the second arrangement yields longer response time, it greatly simplifies the implementation. For this reason, the second approach is adopted in the present invention resulting in simplicity and reduced cost. The response time is optimized on the basis of this channel sharing selection.

In taking the second approach, every input channel (4,800 bps rate) has a dedicated supervision/control capacity of 4800/33 = 145.5 bps since all thirty-three input channels (or eleven input channels) are time sharing a single 4800 bps (or 1600 bps) supervisory channel of a DMA multiplexer. Consequently, if the line channel is 9600 bps, its supervision/control channel is two times 145.5 = 291.0 bps. The signal response time is calculated based on the above channel capacity. Any increase in this supervision/control channel capacity (per 4800 bps channel) not only complicates the DIU-A design but also reduces the DMA multiplexer utilization efficiency, which in turn reduces the channel capacity. Note that the multiplexer supervisory channel is NOT transparent to the communication channel although the data channel in FIG. 5 is completely transparent to the subscriber data transmission. The derivation and implementation of all control signals is accomplished by the transmission device (e.g., modem). The control signals are 2-level DC signals signifying two distinct on/off states. The DIU-A will perform electrical conversion whenever required in order to be electrically compatible with the transmission device.

In FIG. 5, the DIU-A consists of two major portions, namely the channel logic and common logic. The common logic is time shared by all channels which are either 33 or 11 in number, depending on the type of interconnecting multiplexer. Channel logic is provided for each channel in use. The number of word generators in active use is dependent on the number of supervision/control functions required by the modem or other interface device. The word generator generates control/supervision words according to the on/off states of the control/supervision signals. After words are generated, they are all combined serially and the combined serial bits are transferred to the combiner 172 of the common logic under control of the timing distributor 174. The timing distributor receives the timing source from the received clock and distributes its clock pulses to the various channels and to the combiner for outputting under the control of a frame command received from the multiplexer.

The serially combined control/supervision words are transferred into the registers in the combiner vertically at the designated column and shifted out serially and horizontally at the bottom row. The number of bits per vertical column is 2 to 3 bits, thus a total of 3 × 33 = 99 bits is needed in the shift register. The shifter in the combiner is simply to control the timing of all bits shifted both vertically (down) in all columns simultaneously and horizontally (to the right) at the bottom row. The combined output supervision/control bits is 4800 bps (or 1600 bps) exactly in frame phase as signified by the frame reply pulse to the multiplexer. Whenever a maximum of 11 channels is needed, the combiner shift register is strapped in such a way that in the last row the columns from channels 12 to 33 are bypassed. This is easily accomplished by strapping.

In the return direction, exactly the reverse function is performed in the common logic portion so that the appropriate control/supervision words are distributed to the proper channel. The channel logic reassembles the serial bit streams into parallel words and by using the word decoder all states of transmitted control/supervision signals can be derived. The signals are then forwarded to the modem for control and supervision. Word synchronization can be easily obtained because (1) word length is fixed; (2) all words start with a "one"; and (3) all words end with a parity check bit. Because of (2) above, the initiation of a CD/RTS signal can easily be detected. Once the CD/RTS word is found, the counter cycles every five bits. The correct position of the five bit word is constantly verified by checking the last parity bit. Whenever word synchronization is lost, resync is initiated to determine the exact match of the first one-bit and the last parity "p" bit. Loss of word sync is not decided based on only one error check but rather as the result of a up/down counter in order to establish a high confidence level and minimize the erroneous loss of word synchronization. The response time of the control/supervision signals is from 34.5 microseconds minimum to 172.5 microseconds maximum, plus the nominal transmission delay between the two end multiplexers. Note that the CD/RTS signal always maintains a minimum response time of 34.5 microseconds independent of how many control/supervision signals are being implemented.

The DIU-A 147 is the interface unit co-located with the A-MUX in the switching office. It serves as an office terminating unit for a subscriber coming into the office through the subscriber line (loop) and interconnects the subscriber line to the A-MUX after all appropriate interface functions for the subscriber line are performed. In the other direction the reverse functions are performed by the DIU-A including signal conversion for transmission of data from the network A-MUX to the subscriber over the connecting subscriber loop.

Figures 6, 6A, 6B:
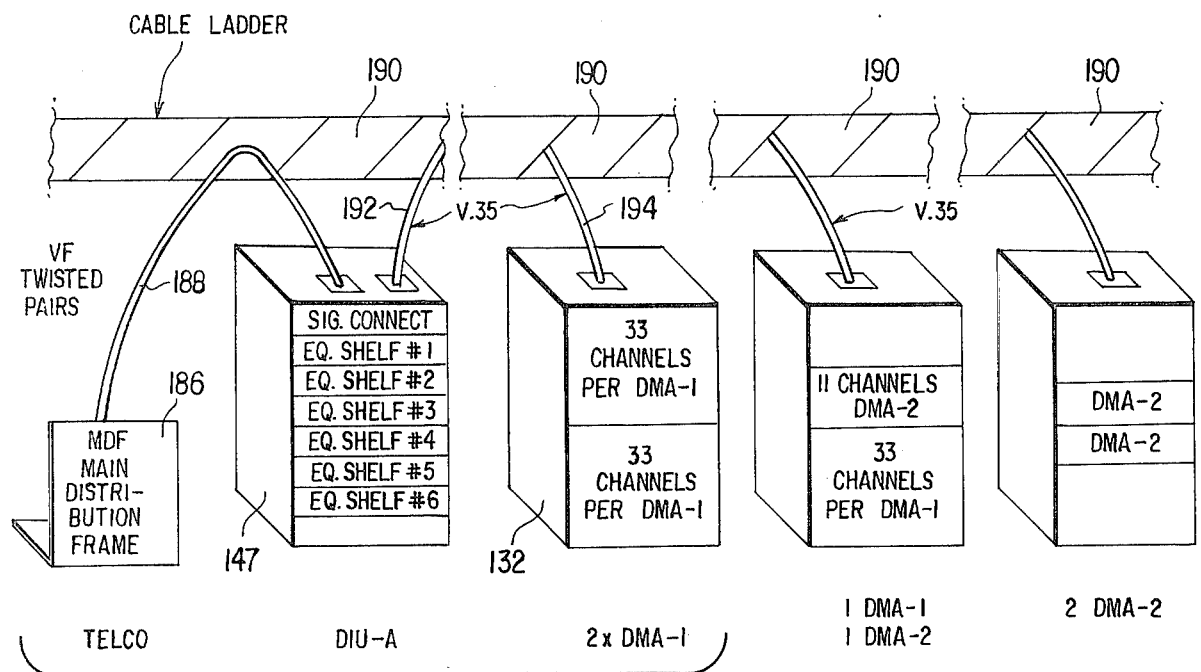
FIG. 6 shows the relationship between the main distribution frame, the DIU-A, and the A-MUX or A-level digital (DMA) multiplexer/demultiplexer.
FIGS. 6A and 6B show alternative A-level multiplexer arrangements.
Figure 7:
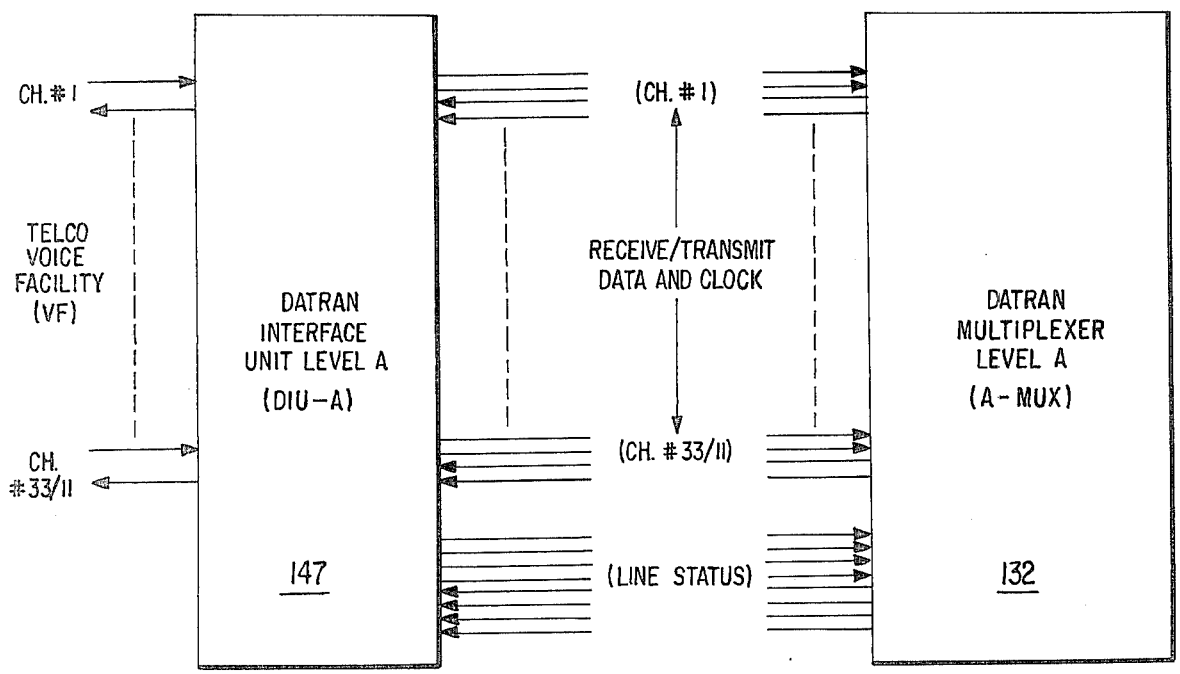
FIG. 7 shows the DIU-A/A-MUX (digital DMA) interfaces.

FIG. 6 illustrates the relationship between the DIU-A and the digital multiplexers. FIGS. 6A and 6B show alternative A-level multiplexer arrangements. As illustrated in FIG. 6, a telco panel main distribution frame (MDF) 186 is connected to the DIU-A 147 by way of voice frequency (VF) twisted pairs 188 and cable ladder 190. In FIG. 6, the DIU-A is shown in turn connected through the cable ladder 190 by way of V.35 leads 192 and 194 to two DMA-1 multiplexers having 33 channels each. An alternative connection is shown in FIG. 6A in which the DIU-A is connected to a unit comprising a DMA-2 and DMA-1. A further alternative in FIG. 6B shows the multiplexer assembly comprising two DMA-2 units. The interface accomplished by these units is shown generally in FIG. 7 and the physical arrangement for the DIU-A 147 is illustrated in FIGS. 8, 9 and 10.

The two major subassemblies of the DIU-A 147 are the signal connect panel and the equipment shelf as best seen in FIGS. 6 and 8. Voice frequency (VF) signals from the main distribution frame and V.35 signals from the multiplexer are tied to the signal connect panel at the top of the DIU-A rack for further internal distribution. The equipment shelf contains up to 11 channel modems and/or poll modules, one supervisory input/output module, one NIBS scanner module, and a shelf power supply module. Each equipment shelf is an integral subassembly such that a minimal configuration for the DIU-A is one rack, cabinet and equipment shelf. One full complement DIU-A rack can serve up to 6 DMA-2 multiplexers or two DMA-1 multiplexers where a DMA-2, as illustrated, in an 11-channel A-MUX and a DMA-1 is a 33-channel A-MUX, or any mixture such that the total number of channels does not exceed 66.

In switched service applications, a DMA-2 multiplexer line status channel interfaces through a supervisory input/output module with up to 11 modems (1 full equipment shelf) and a DMA-1 multiplexer line status channel will interface through a supervisory input/output module with up to 33 modems (interconnected equipment shelves). When three equipment shelves are interconnected to operate with one supervisory input/output module (and DMA-1) the common supervisory input/output module is located in the top of the three interconnecting shelves. Therefore, only one supervisory input/output module is required per multiplexer.

Actual interfacing between the analog VF channels and the digital V.35 multiplex channels is accomplished by an LSI modem. The modem operates at 4800 bps or 9600 bps as determined by strapping. A DIU-A is capable of accomodating up to 66 LSI modems.

The DIU-A contains up to 6 internal DC power supplies for converting-48 volts, plus or minus ten percent to the lower voltages required internally. One supply is provided in each equipment shelf, such that a power supply failure removes at most one shelf from normal operation. Each equipment shelf will accomodate up to 11 modems, one supervisory input/output module, one NIBS scanner module, one shelf power supply module and the signal connect block with cabling. A voice patch (VP) is accomplished by means of one-quarter inch We310 phone plugs and compatible jacks. These jacks are mounted on panels forming part of the equipment shelves. Up to five poll modules may be accommodated in one equipment shelf. The primary function of this module is the emulation of the line signal detect (LSD) signal by means of a network inband signalling (NIBS) transceiver. A secondary function of this module is to assist the poll modem installer in the poll tuneup procedure.

A network inband signalling module is provided for each shelf containing up to eleven modems. This module is capable of detecting and executing up to nine different network signalling commands, i.e., one for clear, three for loop back, and five for future command expansion. The mechanical design is configured such that only front access to the DIU-A is required for both installation and normal operation and maintenance. A removable rear panel is provided for rear access if desired.

To summarize, the DIU-A accommodates up to 66 LSI modems, mounted eleven per shelf in the 6 shelves. In addition to the modems, each shelf is capable of accommodating one supervisory input/output module, and one NIBS scanner module. When one supervisory input/output module is used to serve up to 33 modems, the input/output module slots on equipment shelves 2, 3, 5 and 6 are empty. For a poll application, a poll module is placed directly to the right of the respective polled modem in the appropriate shelf slot. Below each modem slot are mounted the normal phone jacks, so that for emergency patching operation or a test both the line and modem side are accessible. Markers above each modem indicate the particular A-MUX channel to which the modem is assigned.

Figure 11:
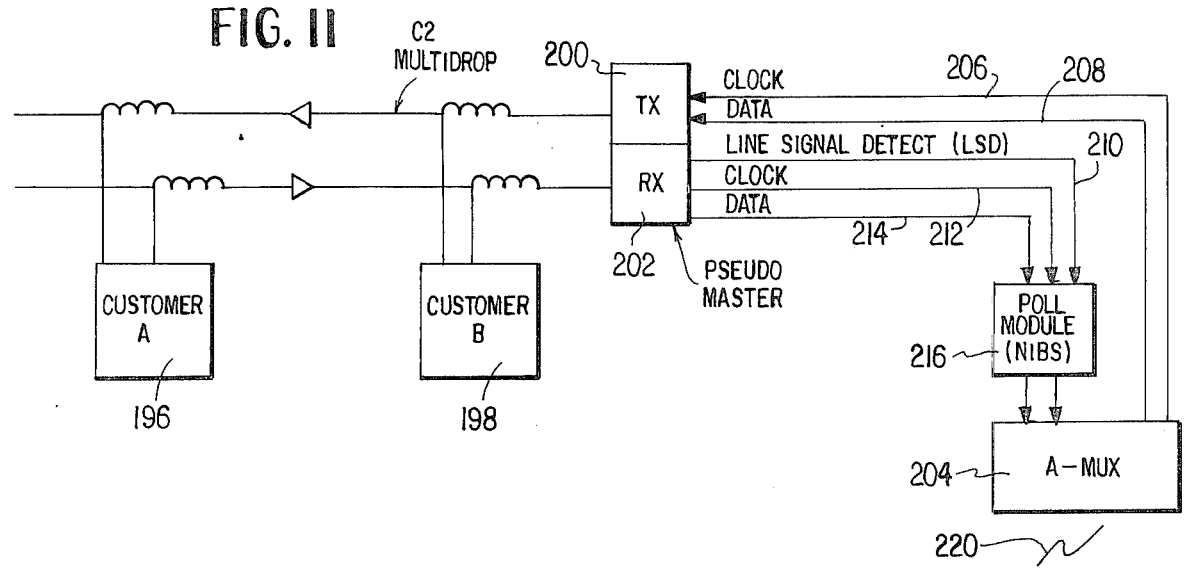
FIG. 11 shows a polled configuration with the modem strapped for poll mode operation.
Figure 12:
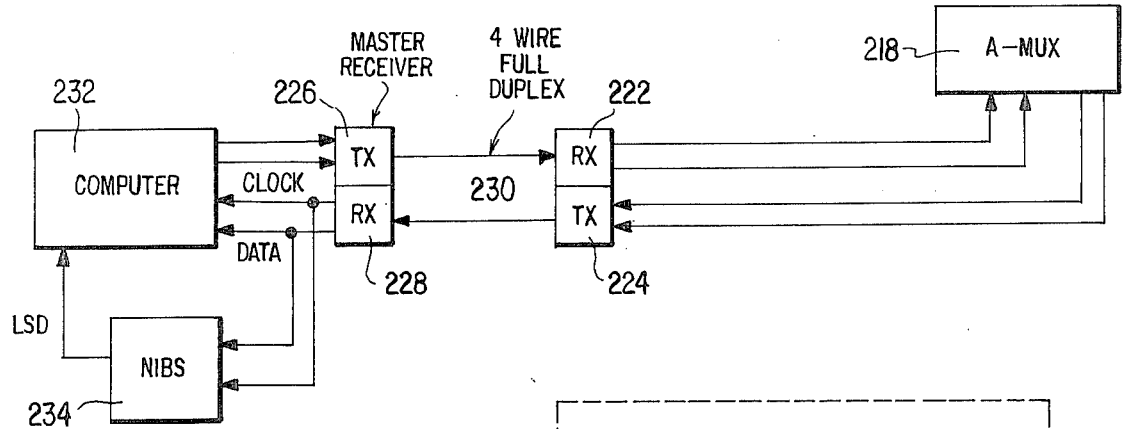
FIG. 12 is a block diagram illustrating a poll tune-up with the modem strapped for a poll mode operation.
Figure 12:
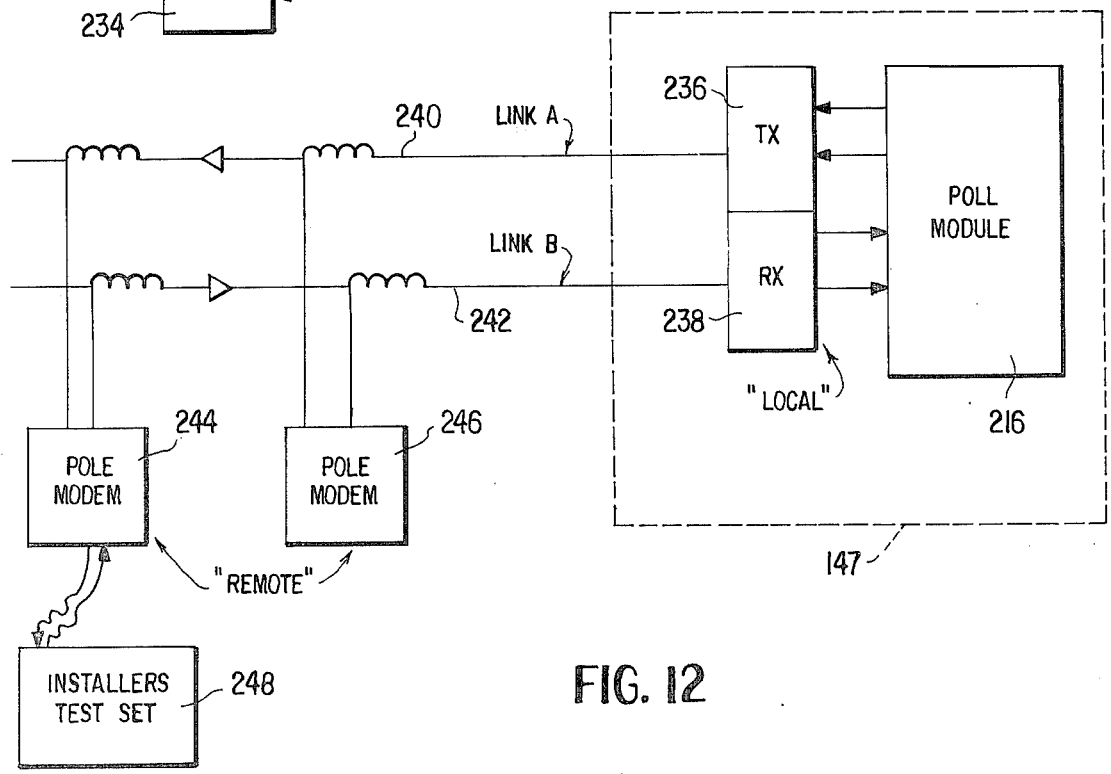

The NIBS scanner module is employed in the DIU-A for the purpose of executing analog loop backs to the digital communications console (DCC) and additional loop backs to the DCC and the A-MUX. The NIBS module is employed to detect and execute additional commands for fault isolation and maintenance. One module is employed for up to 11 channel modems and this module accepts a clock and data from all modems. It has output signal lines sufficient for execution of the loop back and miscellaneous as required. Sufficient protective circuitry is incorporated such that the module cannot be captured by a continually signalling and/or defective channel. The primary function of the poll module is emulation of the Line Signal Detect signal required at the master EDP site. This is illustrated in FIG. 11 which shows polled configuration with the modem strapped for poll mode operation. FIG. 12 illustrates poll tuneup with the modem strapped for poll mode operation. In FIG. 11, customer modules A and B indicated at 196 and 198, are shown as connected across the line to the transmitter 200 and receiver 202. Transmitter 200 receives data and clock from A-MUX 204 by way of leads 206 and 208. The receiver 202 supplies a Line Signal Detect (LSD) over lead 210, a clock signal over lead 212, and data over lead 214, to the poll module, (NIBS) 216, and by way of this module to the A-MUX 204. A second A-MUX 218, coupled by a microwave link as indicated at 220 is similarly connected to a second receiver 222 and second transmitter 224. A master receiver and transmitter comprising a third transmitter 226 and third receiver 228 are connected by a four wire full duplex line 230 to the second receiver and second transmitter. The master receiver and transmitter are in turn connected to the computer 232, both directly and by way of second poll module 234.

As illustrated in FIG. 11, the LSD signal which is available at the pseudo master modem comprising transmitter 200 and receiver 202 is conveyed across the microwave backbone to the full duplex master receiver comprising the transmitter 226 and receiver 228. Information is conveyed through inband signalling.

FIG. 12 shows poll tuneup in which the poll module 216 is combined in the DIU-A 147 with a local transmitter 236 and a local receiver 238. These are connected by links 240 and 242, labelled link A and link B, respectively, to the remote poll modems 244 and 246. Installers test set 248 is shown connected to remote poll modem 244.

A secondary function of the poll module is to assist the installer in the installation testing and strapping of the polled modem transmitter and receiver. In particular, the polled transmitter located at the customer and DCC sites must have transmitter amplitude and delay characteristics adjusted so that the polled receiver is capable of passing acceptable data 70 microseconds after the energy detect line is activated. A polled modem adjust is accomplished by the installer at the DCC with the aid of the installer's test set (ITS). When in the poll adjust mode, this condition is indicated by a light emitting diode on the poll module front panel.

In FIG. 12 the local modem transmitter 236 is pre-equalized for a nominal channel and the remote receivers are allowed to compensate for channel amplitude/delay distortions by means of compensation automatically selected during the normal or slow train period. By contrast the local receiver 238 is compensated for a nominal channel and placed in the fast train mode. Further compensation for channel amplitude/delay distortion in the remote transmitter to local receiver path is made by means of strap selectible pre-equalization curves in the remote transmitters. Selection of the proper strapped curves is the objective of the poll tuneup procedure. A secondary purpose of this procedure is a verification of the proper polled system operation (error rate) after the allowed 70 microseconds fast poll train period.

Figure 16:
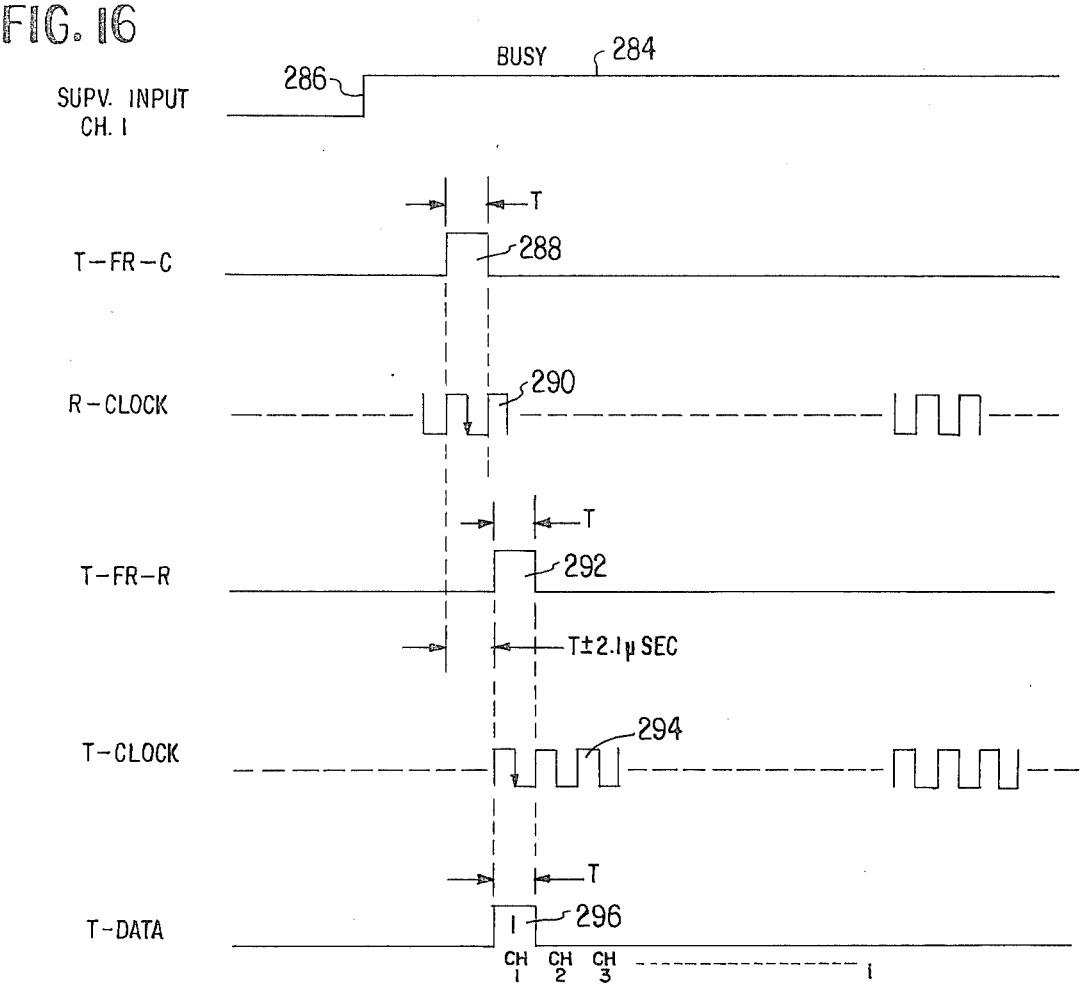
FIG. 16 is a similar timing diagram for transmit data from the supervisory input/output.
Figure 16:
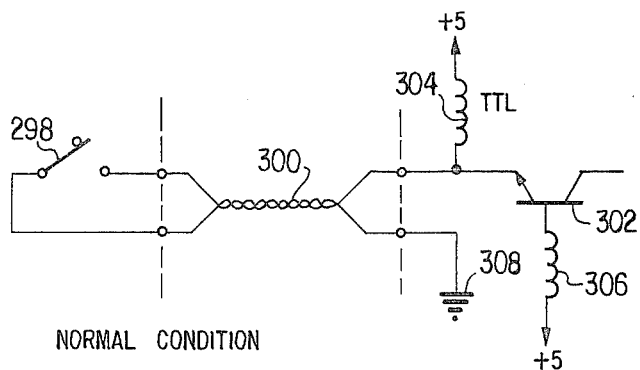
Figure 17:
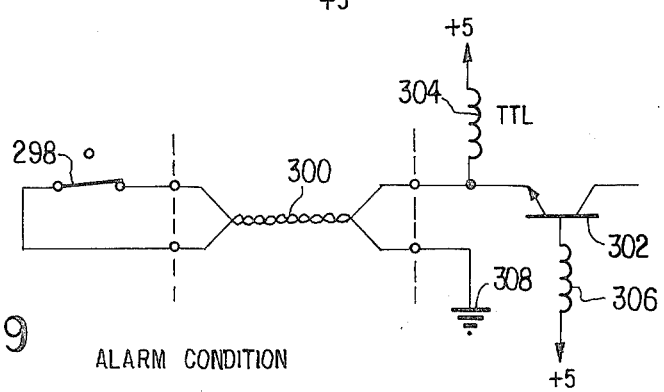
FIG. 17 is a similarly explanatory chart of FIG. 16 relating to the two types of multiplexers.

FIG. 13 is a block diagram of a supervisory input/output module and FIG. 14 shows the timing diagram for received data at supervisory input/output. This is correlated in block form in FIG. 15 for two different DMA's. FIG. 16 shows the timing diagram transmit data from the supervisory input/output and this is similarly correlated in block form in FIG. 17.

In FIG. 13, A-MUX 132 is shown connected to a supervisory input/output module 250. The module is illustrated as including delay lines, latches, and demultiplex logic generally indicated at 252 interconnected by a switch 254 with multiplexer logic 256, so as to be switchable between DMA-1 and DMA-2 modes. Received data is supplied from A-MUX 132 by way of a lead 258, received clock on lead 260 and received synch (frame) (received supervisory frame pulse) on lead 262. Supplied to the A-MUX from the multiplexer logic 256 by way of a lead 264 is transmit data and transmit clock is supplied on lead 266. Lead 268 supplies a supervisory frame reply (transmit) from the multiplex logic to the A-MUX in response to a signal from the A-MUX on lead 270 in the form of a supervisory frame command. Supervisory output signals from block 252 are generally indicated at 272 and supervisory input signals are correspondingly indicated at 274 as applied to the multiplexer 256.

As illustrated in FIG. 13, the supervisory input/output module accepts supervisory signals and distributes supervisory signals up to 33 channel modems. Signals to and from the modems are not clocked and contain only binary or "state" information. From the A-MUX 132, the module accepts data, clock frame command and frame sync signals. Clock, data, and a frame reply are supplied to the A-MUX supervisory channel port. The frame reply is in response to the A-MUX frame command signal and corresponds to the time slot employed to deliver supervisory information for the channel. The duration of the frame command, frame reply, and transmit frame is exactly one bit. Frame pulses are separated by 66 time slots for a DMA-1 and 22 time slots for a DMA-2 at the respective interface rates. The bit rate at the supervisory channel port is 1600 bps for DMA-2 and 4800 bps for a DMA-1. The frame format for the received data is illustrated by the wave forms in FIG. 14 and the frame format for the transmit data is illustrated by the wave forms or timing diagram of FIG. 16. The number of channels and bit rates in each instance for a DMA-1 and a DMA-2 are shown in block form in FIG. 15 and 17.

In FIG. 14, the R-sync (frame pulse) for the received data is shown at 276. The receive data is shown at 278. The receive clock is shown by wave form 280, and the supervisory output for channel 1 by the wave form 282. These wave forms are illustrated in FIG. 14 plotted as a function of time.

In FIG. 16, wave form 284 shows the supervisory input for channel 1. The step at 286 indicates a busy status. Wave form 288 shows the supervisory frame command (transmit), wave form 290 is the received clock and wave form 292 is the supervisory frame reply (transmit). The distance between the leading edge of the supervisory frame command pulse of wave form 288 and the supervisory frame reply pulse in wave form 290 is illustrated in FIG. 16 as equal to the reply pulse width, plus or minus 2.1 microseconds. The transmit clock wave form is illustrated at 294, and the data pulses at 296.

Switching or strapping is used to convert the supervisory module between DMA-1 and DMA-2 operation. The A-MUX line status/supervision channel accommodates a fixed delay for one bit (1/4800 seconds for DMA-1 and 1/1600 seconds for DMA-2) ±2.1 microseconds maximum variation between the DMA frame command and DIU-A frame reply. This specification includes connecting cable delay. The supervisory signals from the A-MUX to the module are processed such that two successive similar signals or states must occur before this signal or state is an output to the DIU-A modem. Supervisory signals from the modem to the supervisory input/output module are smoothed sufficiently in the channel modem as illustrated in FIGS. 14 and 16. Modems sharing the same supervisory input/output module must interface with the same A-MUX as the module itself.

FIG. 18 shows the normal circuit condition for the fault alarm and control system interface, and FIG. 19 shows the circuit in the alarm condition.

FIG. 18 shows relay 298 with the contact in the normally open condition. This is connected by a twisted pair 300 to the emitter of bipolar transistor 302. The emitter of the transistor is connected through a coil 304 forming part of a transistor logic circuit (TTL) to a five volt power supply as indicated. The transistor base is connected through a second coil 306 to the power supply. One side of the twisted pair transmission line is connected to ground as indicated at 308. FIG. 19 shows the same circuit with the contact of relay 298 in the alarm or closed position.

A fault alarm monitor is provided for the modems and power supply modules. The alarm condition is indicated by the closure of relay contact. The relays are capable of operating with between ten and fifty miliamperes flowing through the closed contacts. Maximum allowable voltage is ten volts.

Four alarm relays are provided for each equivalent shelf. Two of the four relays convey modem related alarms or test modems, while the remaining two relays convey a shelf power supply alarm status. Power supply alarms include the temperature of air flow and acceptable output voltages. The power supply alarm relay is of the form B type, such that under normal conditions the contacts are open when the relay is energized. The alarm indication is maintained for a period greater than 11 seconds for recognition by the fault alarm and control system.

It is apparent from the above that the present invention provides an improved data transmission system, and particularly one adapted for use with both switched and private line service. It is particularly directed to an interface unit or DIU-A, which interfaces the local loop or customers loop with the A-level multiplexer of the multiplexer hierarchy in the data transmission system.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by U.S. Letters Patent is:

1. A high speed microwave data transmission network, said network comprising, in combination:
    data carrying and translating means compatible with both private line and switched circuit data systems,
    an elongated microwave backbone trunk forming a signal carrier as part of said data carrying means,
    a plurality of separate, parallel local data distribution channels, a plurality of digital interfacing units, a hierachy included in said data translating means and including a plurality of successively positioned, signal translating MUX groups, wherein each of said MUX groups has a higher data bit timewise capacity than its predecessor MUX,
    at least one of said channels coacting with at least one of said digital interfacing units and with at least one of said MUX groups,
    at least one of said interface units including a first separate logic circuit means for translating data in said one channel into output translated data,
    and a second logic data translating circuit means, connected to each of said first logic coacting channels.

2. A network according to claim 1 wherein each of said channel logic circuits include an assembler and a parallel to serial converter.

3. A network according to claim 1 wherein said channel logic circuits each include a control word generator coupled to said assembler and parallel to serial converter.

4. A network according to claim 2 wherein said common logic circuit comprises a combiner, said assembler and parallel to serial converters being coupled to said first combiner.

5. A network according to claim 4 wherein said combiner comprises a shifter and a plurality of shift registers.

6. A network according to claim 5 wherein said shift registers comprise a matrix of rows and columns, an output lead coupled to the bottom of said rows, and wherein said channel logic circuits are coupled to respective ones of said columns.

7. A network according to claim 6 wherein said shifter includes means to cause said data to shift vertically downward from row to row in said register and serially out of the bottom of said rows.

8. A network according to claim 6 wherein said combiner comprises a timing distributor conductively coupled to said shifter.

9. A data transmission network comprising a plurality of local distribution channels, a microwave backbone trunk, a multiplexer hierarchy coupling said local distribution channels to said backbone trunk, said hierarchy comprising first, second and third level combination multiplexer/demultiplexers, a time division switch coupled between said second and third level multiplexer/demultiplexers, at least some of said local distribution channels including modems, an interface unit coupling said modem channels to said first level multiplexer/demultiplexer, said interface unit comprising a channel logic circuit for each modem channel and a common logic circuit for all said modem channels coupled to said channel logic circuits, and a supervisory input/output module coupling said common logic circuit to said first level multiplexer/demultiplexer.

10. A network according to claim 9 wherein said supervisory input/output module includes in operative association delay lines, latches, multiplexer logic circuitry, and demultiplexer logic circuitry.

11. A network according to claim 10 wherein said interface unit includes a poll module.

12. A network according to claim 11 wherein said channel logic circuits each include an assembler and parallel to serial converter.

13. A network according to claim 4 wherein said combiner comprises a shifter and a plurality of shift registers.

* * * * *